(12) United States Patent
Seshubabu et al.

(10) Patent No.: US 11,923,548 B2
(45) Date of Patent: Mar. 5, 2024

(54) ELECTRO CATALYST COMPOSITION WITH REDOX BUFFER METAL OXIDES FOR BI-FUNCTIONAL AIR ELECTRODE

(71) Applicant: Indian Oil Corporation Limited, Mumbai (IN)

(72) Inventors: Narayanam Seshubabu, Faridabad (IN); Vakakuzhiyil Gopinathan Anju, Faridabad (IN); Naduhatty Selai Raman, Faridabad (IN); Shailendra Kumar Sharma, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 310 days.

(21) Appl. No.: 17/446,763

(22) Filed: Sep. 2, 2021

(65) Prior Publication Data
US 2022/0069316 A1  Mar. 3, 2022

(30) Foreign Application Priority Data
Sep. 3, 2020  (IN) .............................. 202021038027

(51) Int. Cl.
*H01M 4/90* (2006.01)
*H01M 4/86* (2006.01)
*H01M 12/08* (2006.01)
(52) U.S. Cl.
CPC ......... *H01M 4/9016* (2013.01); *H01M 12/08* (2013.01); *H01M 2004/8689* (2013.01)

(58) Field of Classification Search
CPC . B01J 23/34; B01J 21/066; B01J 23/10; B01J 23/75; B01J 23/8892; B01J 35/0033;
(Continued)

(56) References Cited

U.S. PATENT DOCUMENTS

| 5,306,579 A | 4/1994 | Shepard, Jr. et al. |
| 6,291,090 B1 | 9/2001 | Kuznetsov et al. |

(Continued)

FOREIGN PATENT DOCUMENTS

| CN | 103007952 A | * | 4/2013 | ............. B01D 53/56 |
| EP | 3965195 A1 | * | 3/2022 | ............. H01M 12/08 |

OTHER PUBLICATIONS

Hang Hu et al., "In situ DRIFTs investigation of the reaction mechanism over MnOx—MOy/Ce0.75Zr0.25O2 (M=Fe, Co, Ni, Cu) for the selective catalytic reduction of NOx with NH3." Applied Surface Science 387, pp. 921-928. (Year: 2016).*

(Continued)

*Primary Examiner* — Patricia L. Hailey
(74) *Attorney, Agent, or Firm* — Workman Nydegger

(57) ABSTRACT

The present invention relates to the redox buffer electro-catalyst for bi-functional air electrode of metal-air batteries and fuel cells, wherein an electro-catalyst comprising of redox buffer oxides facilitates bi-functional activity of air electrode towards oxygen reduction and oxygen evolution reactions at the air electrode-electrolyte interface. The bi-functional activity of electro-catalyst comprising of redox buffer oxides is superior, due to improved electron transfer ability in comparison to electro-catalyst without redox buffer oxides.

11 Claims, 10 Drawing Sheets

(58) Field of Classification Search
CPC ...... B01J 37/031; B01J 37/08; H01M 4/9016; H01M 12/08; H01M 2004/8689
USPC .......................... 502/304, 324, 325, 349, 101
See application file for complete search history.

(56) References Cited

U.S. PATENT DOCUMENTS

| | | | |
|---|---|---|---|
| 8,916,296 B2 | 12/2014 | Feaver et al. | |
| 9,048,511 B2 | 6/2015 | Mizuno | |
| 9,502,717 B2 | 11/2016 | Kogan et al. | |
| 9,647,275 B2 | 5/2017 | Serov et al. | |
| 9,941,516 B2 | 4/2018 | Khasin et al. | |
| 2002/0016259 A1* | 2/2002 | Yoshikawa | B01J 23/75 502/79 |
| 2006/0252635 A1* | 11/2006 | Ovshinsky | H01M 4/9083 502/154 |
| 2007/0049489 A1* | 3/2007 | Becue | B01J 23/002 502/304 |
| 2011/0207069 A1* | 8/2011 | Lambert | B01J 23/8892 502/328 |
| 2012/0003548 A1 | 1/2012 | Shishikura | |
| 2014/0045081 A1 | 2/2014 | Matter et al. | |
| 2015/0065333 A1 | 3/2015 | Ge et al. | |
| 2015/0349325 A1 | 12/2015 | Chen et al. | |
| 2016/0136620 A1* | 5/2016 | Nazarpoor | B01J 23/10 502/302 |
| 2017/0072386 A1* | 3/2017 | Hayashida | B01J 35/023 |

OTHER PUBLICATIONS

Kotaro Fujimoto et al., "Cobalt-doped electrolytic manganese dioxide as an efficient bifunctional catalyst for oxygen evolution/reduction reactions." Electrochimica Acta 354, pp. 1-9. (Year: 2020).*

Jishuang He et al., "Enhancement effect of oxygen mobility over Ce0.5Zr0.2O2 catalysts doped by multivalent metal oxides for soot combustion." Fuel 286, pp. 1-9. (Year: 2021).*

Yongye Liang et al., "Covalent Hybrid of Spinel Manganese-Cobalt Oxide and Graphene as Advanced Oxygen Reduction Electrocatalysts." Journal of the American Chemical Society 134, pp. 3517-3523. (Year: 2012).*

Boxiong Shen et al., "A comparative study of Mn/CeO2, Mn/ZrO2, and Mn/Ce—ZrO2 for low temperature selective catalytic reduction of No with NH3 in the presence of SO2 and H2O." Journal of Environmental Sciences 25 (4), pp. 791-800. (Year: 2013).*

Xiaopeng Zhang et al., "Cobalt Modification for Improving Potassium Resistance of Mn/Ce—ZrO2 in Selective Catalytic Reduction." Chemical Engineering and Technology, 39, No. 5, pp. 874-882. (Year: 2016).*

Xiaopeng Zhang et al., "A contrastive study of the introduction of cobalt as a modifier for active components and supports of catalysts for NH3—SCR." Journal of Industrial and Engineering Chemistry 19, pp. 1272-1279. (Year: 2013).*

Zhongkui Zhao et al., "Mesostructured Co—Ce—Zr—Mn—O composite as a potential catalyst for efficient removal of carbon monoxide from hydrogen-rich stream." Catalysis Science and Technology, 3, pp. 2130-2139. (Year: 2013).*

Yu, Xingwen et al., "MnNiCoO4/N—MWCNT nanocomposite catalyst with high selectivity in membraneless direct formate fuel cells and bifunctional activity for oxygen electrochemistry", Catalysis Science & Technology, Royal Society of Chemistry, Feb. 16, 2015, DOI: 10.1039/c4cy01702a.

* cited by examiner

Chronopotentiometry test done at 10 mA/cm² for OER stability test on
(i) Control catalyst (CM) and (ii) CM-CZ-2-VC catalyst Air Electrode Construction

ELECTRO CATALYST COMPOSITION WITH REDOX BUFFER METAL OXIDES FOR BI-FUNCTIONAL AIR ELECTRODE

FIELD OF THE INVENTION:

The present invention relates to an electro-catalyst with bi-functional characteristics. In particular, the invention relates to an electro-catalyst comprising of redox buffer oxides, which facilitates bi-functional activity of air electrode towards oxygen reduction and oxygen evolution reactions at the electrode-electrolyte interface.

BACKGROUND OF THE INVENTION:

US9048511B2 discloses a layered double hydroxide catalyst represented by formula $[M^{2+}1-xM^{3+}x(OH)2][An-x/n \cdot yH2O]$, where, $M^{2+}$ represents a divalent metal ion selected from the group consisting of $Mg^{2+}$, $Mn^{2+}$, $Fe^{2+}$, $Co^{2+}$, $Ni^{2+}$, $Cu^{2+}$ and $Zn^{2+}$, while $M^{3+}$ represents a trivalent metal ion selected from the group consisting of $Al^{3+}$, $Cr^{3+}$, $Fe^{3+}$, $Co^{3+}$ and $In^{3+}$, whereas An— represents an n-valence anion selected from the group consisting of F—, Cl—, Br—, I—, $CO_3^{2-}$, $SO4^{2-}$, $NO^{3-}$, $OH^-$ and $R-CO^{2-}$, where R represents a substituent selected from the group consisting of alkyl groups having 1 to 5 carbon atoms, 0<x<1, and y is a real number greater than zero used as air electrode catalyst in the metal-air battery. However, such layered double hydroxide catalyst composition may undergo structural changes during sintering procedure of air electrode fabrication process. Moreover, these catalysts are only suitable for organic electrolyte-based Lithium-air battery and are not suitable for aqueous electrolyte-based metal-air batteries and fuel cells.

US20150349325A1 discloses a bi-functional electrode for a metal-air battery by direct growth of metal oxide nanowires preferably, cobalt oxide or nickel metal oxide nanowires on porous metallic surface using a chemical deposition process. Thus, formed metal oxide nanowires on porous metallic sheet is used as air electrode in the prior art. Fabrication of metal oxide nanowires is challenging during scale-up as it requires growth directly on the porous metal substrate.

US9647275B2 discloses a catalyst preparation of porous metal oxide composite using a solution of dispersed sacrificial support and template particles. The silica is used as sacrificial support, which is being removed chemically using an alkaline solution. The transition metal is selected from the group consisting of Ce, Cr, Cu, Fe, Mo, Ni, Ru, Ta, Ti, V, W, and Zr for making porous metal oxide. The method of catalyst preparation involves the use of a sacrificial silica template followed by series of thermal treatments, thus making catalyst preparation cumbersome as it is highly chemical and energy intensive process.

US6291090B1 discloses a bi-functional air electrode prepared with water soluble metal precursors impregnated on carbon followed by water evaporation. The ORR catalyst is derived from the silver metal precursor, while the OER catalyst is derived from Iron, Cobalt, Nickel precursors. The catalyst composition requires silver metal for displaying ORR activity.

US20140045081A1 discloses a bi-functional catalyst derived from iron/cobalt supported on nitrogen doped carbon wherein nitrogen content varies from 0.1 to 10 mol%. One of the catalyst preparations comprises impregnation of organic phosphorus and/or organic nitrogen compound over carbon supported iron or cobalt catalyst, and then pyrolyzing at high temperature to get nitrogen doped carbon material. The disclosed catalyst resulted after multiple steps such as initial synthesis of metal supported catalyst, acid washing and then deposition of carbon by treating nitrogen containing molecules at high temperature.

US5306579A discloses catalysts such as CoTMPP, LaNi1-x Cox Oy, Ag, Cox Oy, and the oxygen evolution catalyst such as WC with 1 to 20% by weight Co, $FeWO_4$, NiS. The disclosed air electrode catalyst composition is a complex mixture of organometallics and transitional metal oxides and precious metals like silver.

US8916296B2 discloses mesoporous carbon materials as bifunctional catalysts comprising of iron, nickel and manganese metals, which are reported as active for oxygen reduction while tungsten carbide is used for OER activity. The list of metals disclosed is iron, nickel, cobalt, manganese, copper, ruthenium, rhodium, palladium, osmium, iridium, gold, hafnium, platinum, titanium, rhenium, tantalum, thallium, vanadium, niobium, scandium, chromium, gallium, zirconium, molybdenum or combinations or alloys.

US20120003548A1 discloses the bi-functional catalysts made from oxycarbonitride of a specific transition metal selected from of a Group IV transition metal and/or a Group V transition metal preferably with formula $Nb_aM_bC_xN_yO_z$ where $0.01 \le a<1$, $0<b \le 0.99$, $a+b=1$, $0.02 \le x \le 1.2$, $0.01 \le y \le 0.7$, $0.4 \le z \le 2.5$, and $1 \le x+y+z \le 3.9$, and M is at least one metal selected from the group consisting of tin, indium, platinum, copper, iron, chromium, molybdenum, tungsten, hafnium, cobalt, manganese, cerium, nickel, yttrium, lanthanum, samarium, calcium, barium and magnesium.

US9502717B2 discloses $LaNiO_3$-CNT composite bi-functional catalysts wherein CNT is deposited on the $LaNiO_3$ catalyst by chemical vapor deposition at elevated temperatures. The $LaNiO_3$ catalyst preparation uses the citric acid and nitric acid in excess moles to the active metal precursors, which causes acid/waste effluents especially while catalyst produces in a large scale.

US20150065333A1 discloses pervoskite based lanthanide catalyst consisting of lanthanide metal and two different transition metals with formula $La(M_1M_2)O_{3-\delta}$.

US9941516B2 discloses bifunctional nano-porous silver catalyst on zirconium oxide, where zirconium oxide located within the pores of silver particles. The said catalyst comprises 95 to 98% silver metal on zirconium oxide as support.

Variety of bi-functional active catalysts have been reported for promoting oxygen reduction and oxygen evolution reactions. Among them, the widely reported oxygen reduction reaction (ORR) catalysts are based on the silver, platinum, spinel, perovskites, while oxygen evolution reaction (OER) catalysts mostly based on catalysts containing cobalt and tungsten, $LaNiO_3$, $NiCo_2O_4$ and $Co_3O_4$. Most of the catalysts known in the art are complex combination of a wide array of metals in eccentric compositions, tedious catalyst preparation procedures. Therefore, it is essential to explore a new type of advanced bi-functional electro-catalysts with robust activity and durability for their widespread use in electrochemical energy storage applications.

In general, poor electron conduction and insufficient activity of oxygen reduction and oxygen evolution reactions at the electrode-electrolyte interface is common problem of non-noble metal oxide catalysts. In the current invention, electro catalyst composition with redox buffers exhibits an exceptional bi-functional activity towards oxygen reduction and oxygen evolution reactions, and also its durability in the alkaline medium which led to solve the intractable problem associated with non-noble metal catalysts.

SUMMARY OF THE PRESENT INVENTION:

The present invention discloses an electro-catalyst with bi-functional characteristics, i.e., bi-functional electro-catalyst with redox buffer that can be used as air electrode in metal-air batteries and fuel cells.

In a preferred aspect the present invention discloses an electrocatalyst composition comprising redox buffer metals represented by the general formula $(Mn_xO_y)(Co)^{n+}/Ce_iZr_jO_2$ (Formula 1) wherein x=1 to 5, y=2 to 8, n=2 to 3, i=0.01 to 0.75 and j=0.1 to 0.95.

In another aspect of the present invention the manganese in electrocatalyst composition is in the range of 0.1 to 99 wt%, and cobalt is in between 0.1 to 30 wt%, and cerium-zirconium in the range of 0.1 to 5 wt%, and weight ratio of cerium to zirconium in the range of 0 to 1.

In another aspect of the present invention discloses an electrode comprising the electro-catalyst represented by the general formula $(Mn_xO_y)(Co)^{n+}/Ce_iZr_jO_2$ (Formula 1) wherein x=1 to 5, y=2 to 8, n=2 to 3, i=0.01 to 0.75 and j=0.1 to 0.95.

In another aspect the present invention discloses electrochemical cell comprising an electrode comprising the electro-catalyst represented by the general formula $(Mn_xO_y)(Co)^{n+}/Ce_iZr_jO_2$ (Formula 1) wherein x=1 to 5, y=2 to 8, n=2 to 3, i=0.01 to 0.75 and j=0.1 to 0.95.

In another aspect of the present invention the electrochemical cell is a fuel cell, a battery, a redox flow battery, or a metal/air rechargeable cell.

In another aspect of the present invention electro catalyst composition is be prepared by any of the techniques selected from the group consisting of wet-impregnation, sequential precipitation, co-precipitation, deposition-precipitation, and solvothermal synthesis.

In another preferred aspect the present invention discloses a method for preparing electrocatalyst composition comprising redox buffer metals, said method comprising steps of:
(i) preparing cobalt-manganese hydroxides solution comprising steps of:
  a) preparing separate solutions of cobalt and manganese precursors in deionized water,
  b) mixing the precursor solutions of cobalt and manganese,
  c) adding alkaline base solution selected from the group consisting of an aqueous solution of NaOH, Na$_2$CO$_3$, NaHCO$_3$, NH$_4$OH, or combination thereof to the mixed precursor solution of cobalt and manganese obtained in step b), at a pH of 7 to 11 and obtaining precipitated cobalt-manganese hydroxides;
(ii) preparing a redox buffer metal precursor solution comprising steps of:
  a) preparing separate solutions of cerium and Zirconyl precursors in deionized water,
  b) optionally mixing the cerium precursor solution and zirconyl precursor solution to obtain a composite solution;
(iii) mixing of precipitated solution of cobalt manganese hydroxides with redox buffer metal precursor solutions comprising steps of:
  a) mixing the precipitated solution of cobalt-manganese hydroxides obtained in step (i) c) with cerium precursor solution and zirconyl precursor solution obtained in step (ii) a) or a composite solution obtained in step (ii) b),
  b) stirring the resultant suspension for 12 hours,
  c) vacuum filtering the suspension obtained in step (iii) b) to obtain the catalyst slurry,
  d) repeatedly washing the catalyst precipitates obtained in step (iii) c) with deionized water, followed drying the obtained catalyst cake in oven at 50 to 100° C., and
  e) calcining the catalyst cake at 400-600° C. to obtain electro-catalyst composition with redox buffer metals of formula (1)

$$(Mn_xO_y)(Co)^{n+}/Ce_iZr_jO_2, \text{ wherein } x=1 \text{ to } 5, y=2 \text{ to } 8, n=2 \text{ to } 3, i=0.01 \text{ to } 0.75 \text{ and } j=0.1 \text{ to } 0.95.$$

In another aspect of the present invention, the cobalt precursor in electrocatalyst composition comprising is selected from the group consisting of cobalt nitrate, cobalt chloride, cobalt acetate, and cobalt sulfate, and wherein the cobalt precursor is preferably cobalt nitrate hexahydrate.

In another aspect of the present invention, the manganese precursor in electrocatalyst composition comprising is selected from the group consisting of manganese nitrate tetrahydrate, manganese acetate tetrahydrate, manganese sulfate, and manganese chloride, and wherein the manganese precursor is preferably manganese acetate tetra hydrate.

In another aspect of the present invention, the cerium precursor in electrocatalyst composition comprising is selected from the group consisting of cerium nitrate, cerium chloride hepta hydrate, ammonium ceric nitrate hydrate, and ammonium ceric sulphate hydrate, and wherein the cerium precursor is preferably ammonium ceric nitrate hydrate.

In another aspect of the present invention, the zirconium precursor in electrocatalyst composition comprising is selected from the group consisting of zirconyl chloride octahydrate, and zirconyl nitrate hydrate, and wherein the zirconium precursor is preferably zirconyl chloride octahydrate.

OBJECTIVES OF THE PRESENT INVENTION:

It is a primary objective of the invention to develop a bi-functional electro-catalyst with redox buffer that can be used as air electrode in metal-air batteries and fuel cells.

It is the further objective of the present invention to develop a redox buffer oxides to be used with electro-catalyst for facilitating bi-functional activity of air electrode with respect to oxygen reduction and oxygen evolution reactions at the air electrode-electrolyte interface.

Another objective of the disclosed invention is to develop a new type of advanced bi-functional electro-catalysts with robust activity and durability for their widespread use in electrochemical energy storage applications.

BRIEF DESCRIPTION OF THE DRAWING:

To further clarify advantages and aspects of the invention, a more particular description of the invention will be rendered by reference to specific embodiments thereof, which is illustrated in the appended drawing(s). It is appreciated that the drawing(s) of the present invention depicts only typical embodiments of the invention and are therefore not to be considered limiting of its scope.

Figure 1:
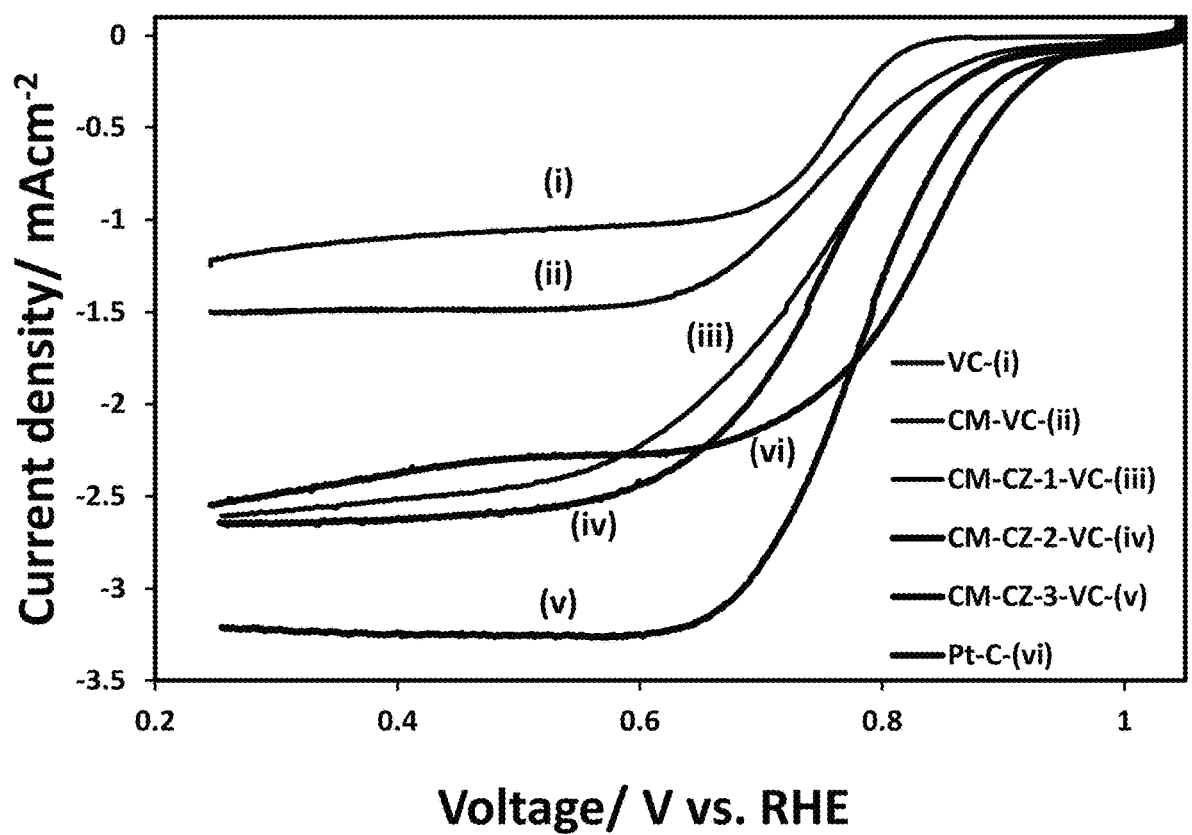
FIG. 1: illustrates Linear sweep voltammogram.

DETAILED DESCRIPTION OF THE INVENTION:

For promoting and understanding of the principles covered by present invention, reference will now be made to the specific embodiments of the present invention further illustrated in the drawings and specific language will be used to describe the same. The foregoing general description and the following detailed description are explanatory of the present disclosure and are not intended to be restrictive thereof. It will nevertheless be understood that no limitation of the scope of the present disclosure is thereby intended, such alterations and further modifications in the illustrated composition, and such further applications of the principles of the present disclosure as illustrated herein being contemplated as would normally occur to one skilled in the art to which the present disclosure relates. Unless otherwise defined, all technical and scientific terms used herein have the same meaning as commonly understood by one of ordinarily skilled in the art to which this present disclosure belongs. The methods, and examples provided herein are illustrative only and not intended to be limiting.

The present invention discloses the preparation of catalyst composition requiring the dissolution of respective metal precursors in water, wherein precursors of cobalt selected from cobalt nitrate, cobalt chloride, cobalt acetate, cobalt sulfate is dissolved in a suitable quantity of water, preferably cobalt nitrate hexahydrate, while precursors of manganese selected from manganese nitrate tetrahydrate, manganese acetate tetrahydrate, manganese sulfate or manganese chloride, preferably manganese acetate tetrahydrate. The redox buffer component namely oxides of cerium and zirconium, wherein cerium precursors selected from cerium nitrate, cerium chloride hepta hydrate, ammonium ceric nitrate hydrate, ammonium ceric sulphate hydrate, preferably ammonium ceric nitrate hydrate, while zirconium, precursors selected from zirconyl chloride octahydrate or zirconyl nitrate hydrate, preferably zirconyl chloride octahydrate.

Further, the present invention discloses an electrocatalyst comprising of redox buffer, represented by formula (1)

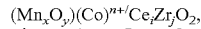
$(Mn_xO_y)(Co)^{n+}/Ce_iZr_jO_2$, (wherein x=1 to 5, y=2 to 8, n=2 to 3, i=0.01 to 0.75 and j=0.1 to 0.95). The electrocatalyst composition comprises manganese in the range of 0.1 to 99 wt %, cobalt in between 0.1 to 30 wt%, redox buffers namely cerium-zirconium in the range of 0.1 to 5 wt%, and the weight ratio of cerium to zirconium varies from 0 to 1. The oxides of cerium and zirconium in the catalyst composition acts as a redox buffer oxide which promotes the activation of oxygen molecule at the air electrode-electrolyte interface. The superior redox activity of catalyst is due to the creation of extra electron transfer active sites because of synergy between oxides of cerium-zirconium and oxides of cobalt-manganese.

In another embodiment, catalyst preparation can be wet-impregnation, sequential precipitation, co-precipitation, deposition-precipitation, solvothermal synthesis. The said catalyst obtained preferably by sequential precipitation process, which involves the mixture of cobalt and manganese precursor solution precipitated with alkaline base solution selected from an aqueous solution of NaOH, Na$_2$CO$_3$, NaHCO$_3$, NH$_4$OH, or combination thereof. The precipitation condition for the catalyst is maintained at high pH between pH 7 to 11, wherein cobalt and manganese precursor solutions are precipitated as hydroxides. Further, pre-calculated amounts of redox buffer metal precursor solutions are being added into a precipitated solution of cobalt-manganese hydroxides and kept this solution under constant stirring for 12 hrs. Thus, the obtained catalyst mass from the above process is filtered under vacuum. The catalyst cake is washed with water several times to remove the residual impurities and then dried in a hot air oven at 50 to 100° C. The oven dried catalyst is further calcined at 400-600° C. to get the finished catalyst.

The oxygen reduction activity and oxygen evolution activity of the catalysts ascertained using rotating disc electrode experiments (RDE), where catalyst coated with vulcan carbon is ball milled and dispersed in a diluted solvent using ultrasonication. The dispersed catalyst is drop casted on glassy carbon electrode and dried to evaporate the solvent. The electrode coated with the catalyst is immersed in 0.5 M potassium hydroxide (KOH) electrolyte. The electrode is connected to RDE assembly, and potential is measured with respect to RHE reference electrode. The voltage is scanned from 1.05 V to 0.25 V across the electrode. The RDE studies reveal that redox buffer electrocatalyst namely CM-CZ-2 shown remarkable onset reduction potential at 0.93 V which is shifted to more positive side together with high current density of 3.3 mA/cm$^2$ while control CM catalyst has shown relatively dismal activity towards oxygen reduction, and on-set reduction potential recorded at 0.86 V with limiting current density of 2.5 mA/cm$^2$. These results confirm that redox buffer catalyst accelerates the oxygen reduction activity by facilitating the faster kinetics for electron transfer.

Figure 2:
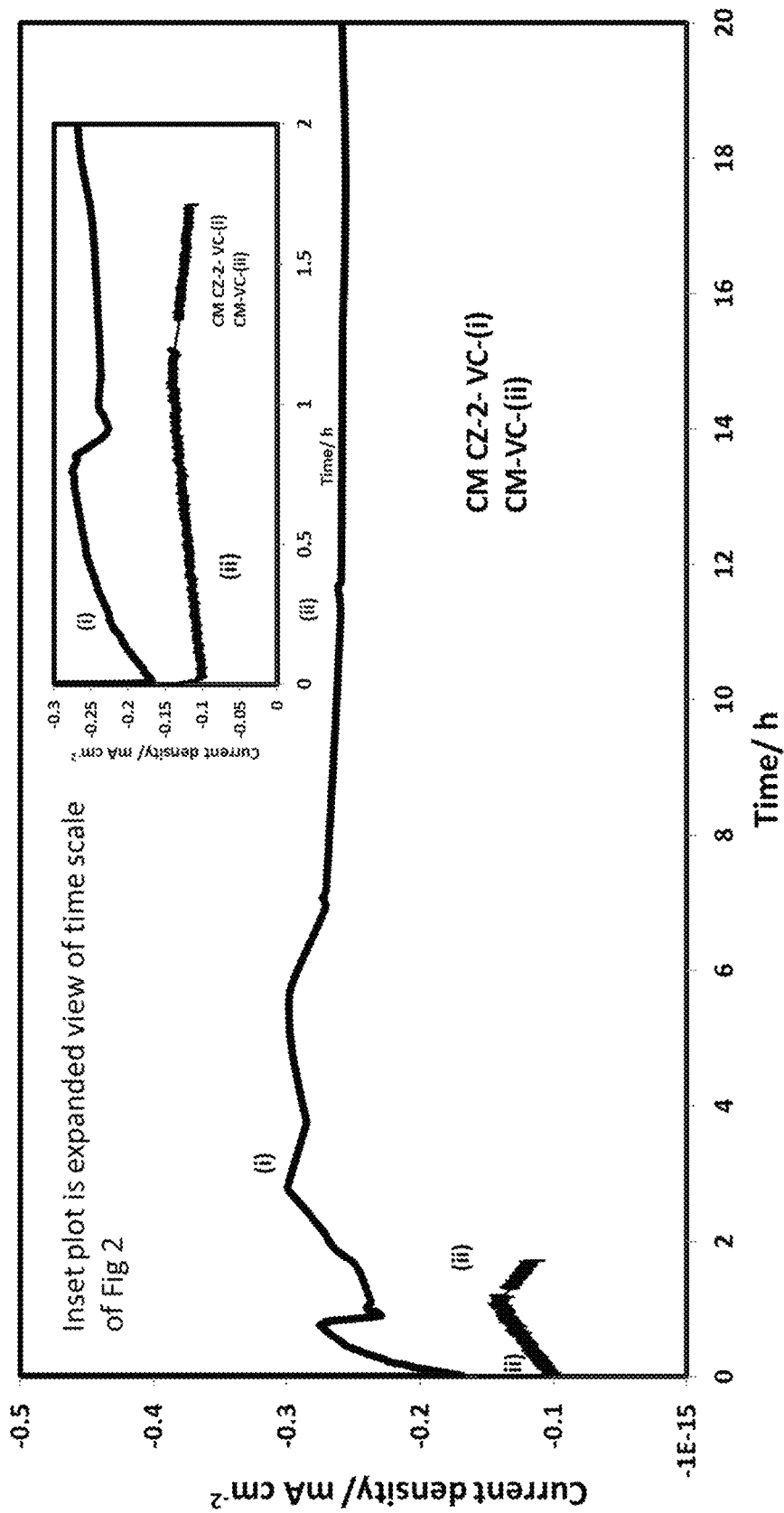
FIG. 2: illustrates stability test for ORR for CM and CM-CZ-2-VC catalyst using chronoamperometry.

The electron transfer number of redox buffer catalysts recorded in the range of 3.2 to 3.9, wherein electron transfer number for redox buffer CM-CZ-2 catalyst recorded as high as 3.9 when compared to control catalyst, CM which recorded the lowest electron transfer number of 3.2. In the detailed embodiment, CM-CZ-2 catalyst yields trace amounts (2-3%) of hydrogen peroxide (H$_2$O$_2$) during ORR process, while in case of control CM catalyst a high amount (15-20%) of H$_2$O$_2$ is formed. The formation of H$_2$O$_2$ arises due to insufficient electron transfer, as a result sluggish oxygen reduction reaction occurs. The formation of H$_2$O$_2$ is an indirect measure of the catalyst efficiency towards ORR activity. The more percentage of H$_2$O$_2$ formation indicates that catalyst is less active for ORR activity. Therefore, CM-CZ-2 catalyst shows the higher efficiency of direct four electron transfer process with less formation of H$_2$O$_2$ indicates that it favors the ORR activity. Electrode durability during ORR activity is measured by chronoamperometry test at constant potential of 0.75 V with respect to RHE, wherein current is being monitored for the reaction with time. In this study, the catalyst modified glassy carbon electrode of 0.3 cm diameter is used as electrode. The material retains more than 95% of its activity or current during 20 hours of operation (FIG. 2), which implies that catalyst is electrochemically stable towards the ORR reaction. While in the case of control catalyst (CM), there is a steep fall in the current (50-60%) in just 5 hours.

In one embodiment, the present invention discloses, the construction of air electrode is composed of three layers such as conductive layer made of carbon rich along with minor composition of catalyst, and catalyst layer along with minor composition of conductive carbon. These two layers are compacted over one side of nickel wire mesh, while other side of nickel mesh is coated with a microporous hydrophobic polymer layer. The microporous hydrophobic polymer layer is essential to permeate the air while preventing the electrolyte flooding from the other electrode surface. In one embodiment, the present invention discloses, the conductive layer is fabricated by mixing the catalyst with suitable conductive carbons such as carbon black, vulcan carbon, carbon nanotubes, graphene, or heteroatom doped carbon nanomaterials. Thus, obtained catalyst-carbon composite is mixed with hydrophobic binders, which can be selected from poly-tetrafluoro ethylene (PTFE), poly-vinyl difluoride (PVDF), styrene-butadiene rubber (SBR), natural latex rubber or petroleum wax. Further the binder mixed catalyst-carbon composite is dispersed in the solvents selected from diethylene glycol monoethyl ether, diethylene glycol monobutyl ether, diethylene glycol diethyl ether, diethylene glycol dibutyl ether in an appropriate ratio, typically solvent is in excess to the solids, preferably 2:1 ratio. The solvent selection for making the catalyst slurry is environmentally benign, non-corrosive and less toxic.

In one embodiment, the present invention discloses, the binder mixed catalyst-carbon composite is dispersed in solvent preferably diethylene glycol monobutyl ether using a homogenizer to obtain the catalyst slurry, which is subsequently coated over the conductive metallic substrate preferably expanded porous nickel with pore size preferably 0.1-0.5 mm pore opening and 0.1 to 1.0 mm of thickness. The casting of the active catalyst layer can be done by spray coating, screen printing, calendaring, preferably calendaring method is employed. Further, the casted catalyst layer on porous nickel mesh is dried to evaporate the solvent followed by sintering in the temperature range of 200 to 500° C., more preferably 250 to 350° C. The sintering process creates pores over the electrode surface, which will act as active sites for oxygen activation. On the other hand, a porous PTFE film is laminated on the back side of the catalyst coated nickel mesh to prevent the electrolyte flooding through air cathode, while it does permeate atmospheric air.

In one embodiment, the present invention discloses the fabricated air electrodes are evaluated for Al-air cell employing suitable concentration of aqueous potassium hydroxide as electrolyte, wherein concentration of electrolyte is in the range of 1 Molar to 10 Molar, preferably in the range of 3 Molar to 7 Molar. The electrolyte is under continuous circulation in the cell using peristaltic pump which is connected to external electrolyte tank. Further aluminium metal composition is >99% to 95% either in pure metal form or Al-alloyed with 2-3% of Magnesium, 1-2% of tin (Sn) are being used as anode plate, while air electrode acts as cathode.

In one embodiment, the present invention discloses open circuit voltage (OCV) of the constructed Al-air cell is in the range of 1.5 V to 1.8 V, whereas under discharge condition cell potential is in the range of 1.3 V to 1 V depends on the applied discharge current density.

In one embodiment, the present invention discloses the performance of Al-air cell is evaluated under discharge condition applying at various current densities ranging from 10 to 300 mA/cm$^2$, preferably between 50 to 200 mA/cm$^2$. The energy density of Al-air cell is measured as 2.0 to 3.0 kWh/kg of aluminum for the aforementioned discharged current density range.

Figure 3:
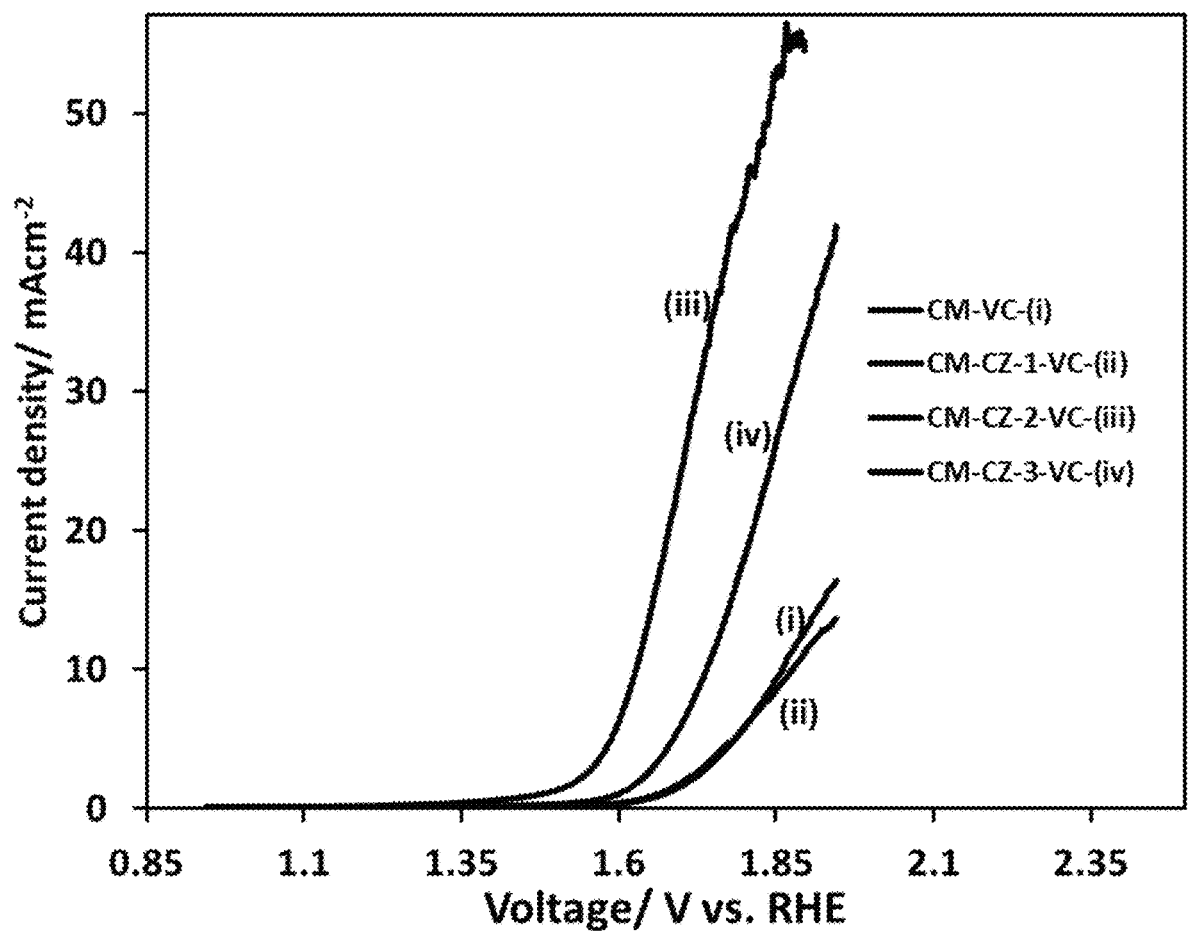
FIG. 3: illustrates Linear sweep voltammogram obtained for the (CM, CMCZ-1-VC, CM-CZ-2-VC, CM-CZ-3-VC for oxygen evolution reaction in 0.5 M KOH solution at 1800 rpm.
Figure 4:
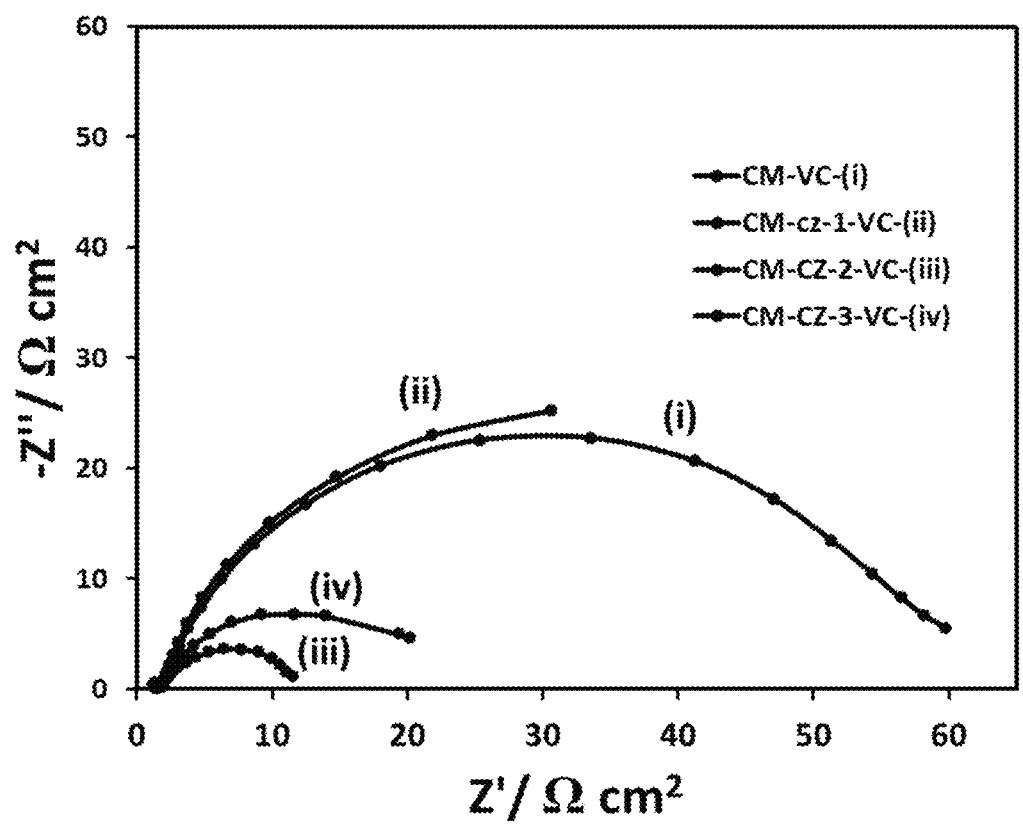
FIG. 4: illustrates Nyquist plot obtained for the catalyst.

In another embodiment, oxygen evolution activity of air electrode is ascertained by RDE studies, wherein OER activity of optimized CM-CZ-2 catalyst exhibit the lowest on-set oxidation potential at 1.48 V against RHE when compared with control catalyst (CM), for which on-set oxidation potential recorded at 1.59 V (FIG. 3). The on-set oxidation potential is lowered by approximately by 110 mV together with steep rise in current implies that oxygen evolution takes place with faster charge transfer kinetics.

In another embodiment, electrochemical impedance of the redox buffer catalysts evaluated in 0.5 M KOH, and measurements recorded at voltage of 1.6 V Vs RHE is shown in FIG. (4). The data reveals that charge transfer resistance of CM-CZ-2-VC (11 Ωcm$^2$) is much smaller than charge transfer resistance of control catalyst, CM (61 Ωcm$^2$).

Figure 5:
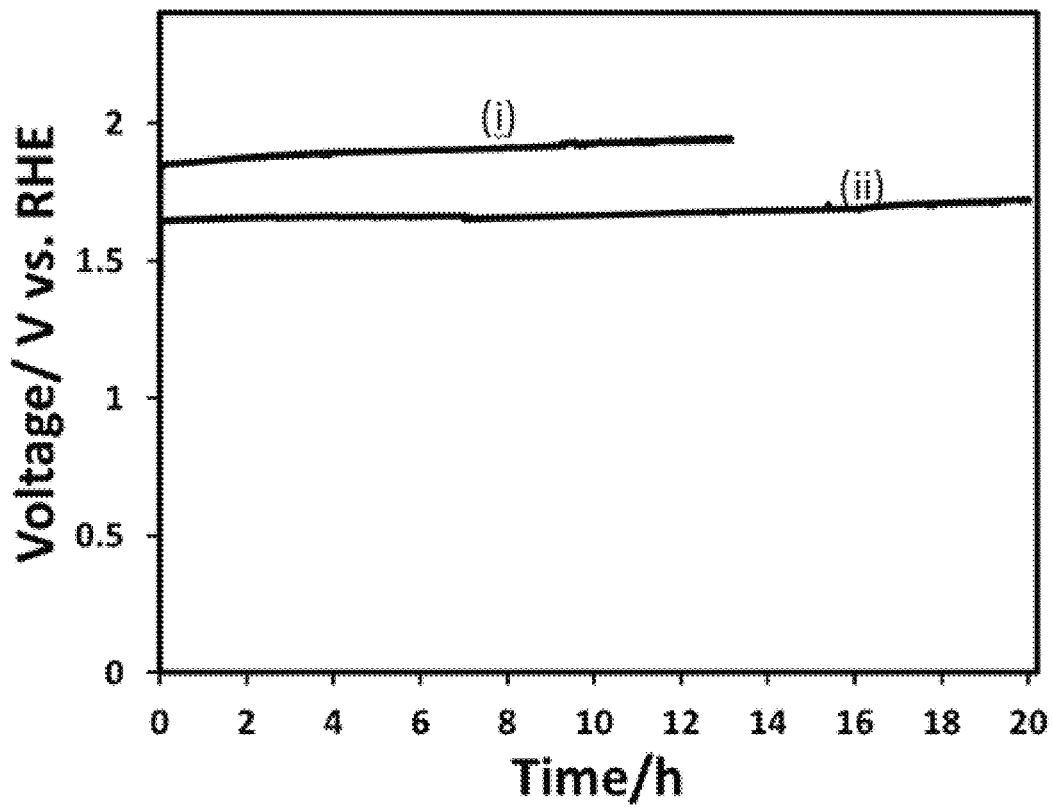
FIG. 5: illustrates chronopotentiometry test done at 10 mA/cm2 for OER stability test.
Figure 6:
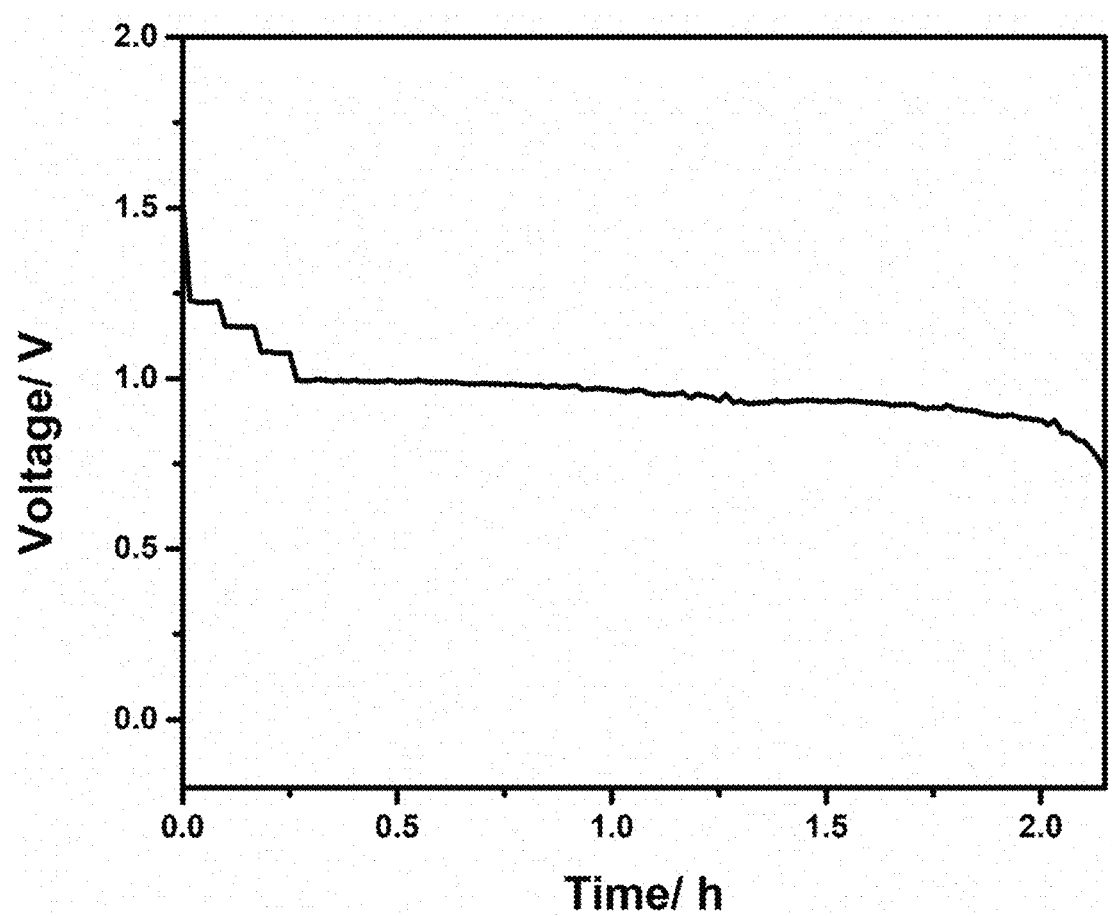
FIG. 6: depicts performance evaluation of Air electrode of CM-CZ-2 catalyst in Al-air cell at 200 mA/cm$^2$ of current density.

In another embodiment, Electrode durability for oxygen evolution reaction by chronopotentiometry at a current density of 10 mA/cm$^2$ indicates that optimized CM-CZ-2 catalyst retains more than 95% of its activity during 20 hours of testing (FIG. 5), Whereas control catalyst (CM), crosses the maximum set limit of potential after 5 hours of operation. This indicates that catalyst with redox buffer not only increases the activity but also stabilize the material from erosion during evolution reaction.

In another embodiment, the performance of bi-functional air electrodes is evaluated for rechargeable Zn-air battery employing suitable concentration of aqueous potassium hydroxide as electrolyte, wherein zinc metal precursor selected from either of zinc dust, zinc oxide, zinc acetate or combination thereof dispersed in saturated potassium hydroxide electrolyte, where electrolyte concentration is preferably in the range of 7 Molar to 10 Molar.

In another embodiment, the performance of Zn-air cell is evaluated under charge/discharge condition, wherein charging of the cell is performed by constant current or constant voltage charging, whereas discharge of the cell is performed by constant current applied at variable current densities ranging from 10 mA/cm$^2$ to 100 mA/cm$^2$. The open circuit voltage (OCV) of the constructed Zn-air cell is noted in the range of 1.4 V to 1.6 V. The voltage of Zn-air cell under charging condition increases up to 2.2 V, while under discharge condition cell potential recorded in the range of 1.3 V to 1 V depends on discharge current density. The energy density of Zn-air cell is measured as 600 to 750 wh/Kg of zinc, and the round-trip efficiency of the cell achieved >50%.

Examples:

Preparation of the catalyst composition:

Example 1: Preparation of Manganese cobalt oxide catalyst $(Mn_xO_y)(Co^{n+})$(CM)(Control catalyst):

In a beaker, 14 grams (gm) of cobalt nitrate hexahydrate is dissolved in 250 milliliters (ml) of de-ionized water. Further, in a separate beaker 98 gm of Manganese acetate tetrahydrate is dissolved in 500 ml of de-ionized water. Thus, prepared solutions of cobalt nitrate and manganese acetate are mixed together and transferred into vessel-1. In another beaker, 2 M sodium hydroxide (NaOH) solution is prepared by dissolving 80 grams of NaOH in 1 litre of water, which is transferred into vessel-2. The metal precursor solution and base solution are simultaneously added using peristaltic pumps into a separate vessel-3 having with water quantity of 200 ml. The precipitation of metal precursor solutions takes place in vessel-3 while maintaining constant pH at 10.5. After obtaining precipitate, the slurry mixture is kept under stirring for 12 hrs. The resulted precipitate is filtered to obtain the catalyst cake, which is further dried in a hot air oven at 100 C for 12 hours and then calcined in a muffle furnace at temperature of 400° C. for 4 hours in order to obtain the catalyst composition CoMn oxide with formula of $(Mn_xO_y)$ $(Co)^{n+}$, where x=3 to 5, y=4 to 8, n=2 to 3. The resulted catalyst has mixed phase composition of Manganese oxides in the form of Mn3O4 and Mn5O8, whereas Cobalt is in strong co-ordination with Manganense oxide with oxidation state of 2 to 3.

Example 2: Preparation of $(Mn_xO_y)(Co^{n+})/Ce_{0.5}Zr_{0.5}O_2$ catalyst (CM-CZ-1)

In a beaker, 14 gm of cobalt nitrate hexahydrate is dissolved in 250 ml of de-ionized water. Further, in a separate beaker 98 gm of Manganese acetate tetrahydrate is dissolved in 500 ml of de-ionized water. Thus, prepared solutions of cobalt nitrate solution and manganese acetate are mixed together and transferred into vessel-1. In another beaker, 2 M NaOH solution is prepared by dissolving 80 gm of NaOH in 1 litre of water, which is transferred into vessel-2. The metal precursor solution and base solution are simultaneously added using peristaltic pumps into a vessel-3 having with water quantity of 200 ml. The precipitation of metal precursors solution takes place in vessel-3 while maintaining constant pH at 10.5.

Further, 0.43 gm of ceric ammonium nitrate and 0.21 gm of zirconyl chloride are separately dissolved in 20 ml of de-ionized water. The mixture of Cerium and zirconium precursor solution is added into the precipitated mixture of Cobalt Manganese slowly using peristaltic pump in 30 min, and the resultant slurry is kept under stirring for 12 hours. Thus precipitate mixture is filtered to obtain the catalyst cake, which is further dried in a hot air oven at 100 C for 12 hours and then calcined in a muffle furnace at a temperature of 400° C. for 4 hours in order to obtain Ce-Zr doped CoMn oxide with formula of $(Mn_xO_y) (Co)^{n+}/Ce_{0.5}Zr_{0.5}O_2$, where x=3 to 5, y=4 to 8, n=2 to 3. The resulted catalyst has mixed phase composition of Manganese oxides in the form of Mn3O4 and Mn5O8, whereas Cobalt is in strong co-ordination with Manganense oxide with oxidation state of 2 to 3. The catalyst is denoted as CM-CZ-1.

Example 3: Preparation of $(Mn_xO_y)(Co^{n+})/CeZrO_2$ catalyst (CM-CZ-2)

In a beaker, 14 gm of cobalt nitrate hexahydrate is dissolved in 250 ml of de-ionized water. Further, in a separate beaker 98 gm of Manganese acetate tetrahydrate is dissolved in 500 ml of de-ionized water. Thus, prepared solutions of cobalt nitrate solution and manganese acetate are mixed together and transferred into vessel-1. In another beaker, 2 M NaOH solution is prepared by dissolving 80 gm of NaOH in 1 litre of water, which is transferred into vessel-2. The metal precursor solution and base solution are simultaneously added into a vessel-3, which is having water quantity of 200 ml The precipitation of metal precursors takes place in vessel-3 while maintaining constant pH at 10.5.

Further, 0.9 gm of ceric ammonium nitrate and 0.45 gm of Zirconyl chloride separately dissolved in 20 ml of de-ionized water. The mixture of Cerium and zirconium precursor solution is added into the precipitated mixture of Cobalt-Manganese using peristaltic pump in 30 minutes and the resultant slurry is kept under stirring for 12 hours. Thus, precipitate mixture filtered to obtain the catalyst cake, which is further oven dried in a hot air oven at 100 C for 12 hours and then calcined in a muffle furnace at a temperature of 400° C. for 4 hours in order to obtain 2 wt% Ce-Zr doped Cobalt-Manganese oxide with formula of $(MnxOy) (Co)^{n+}/CeZrO_2$, where x=3 to 5, y=4 to 8, n=2 to 3.

The resulted catalyst has mixed phase composition of Manganese oxides in the form of Mn3O4 and Mn5O8, whereas Cobalt is in strong co-ordination with Manganese oxide with oxidation state of 2 to 3. The catalyst is denoted as CM-CZ-2.

Example 4: Preparation of $(Mn_xO_y)(Co^{n+})/Ce_{1.5}Zr_{1.5}O_2$ catalyst (CM-CZ-3)

In a beaker, 14 gm of cobalt nitrate hexahydrate is dissolved in 250 ml of de-ionized water. Further, in a separate beaker 98 gm of Manganese acetate tetrahydrate is dissolved in 500 ml of de-ionized water. Thus, prepared solutions of cobalt nitrate solution and manganese acetate are mixed together and transferred into vessel-1. In another beaker, 2 M NaOH solution is prepared by dissolving 80 gm of NaOH in 1 litre of water, which is transferred into vessel-2. The metal precursor solution and base solution are simultaneously added into a vessel-3, which is having water quantity of 200 ml The precipitation of metal precursors takes place in vessel-3 while maintaining constant pH at 10.5.

Further, 1.4 gm of ceric ammonium nitrate and 0.7 gm of Zirconyl chloride separately dissolved in 20 ml of de-ionized water. The mixture of Cerium and zirconium precursor solution is added into the Cobalt-Manganese precipitated mixture and kept under stirring for 12 hours. Thus precipitate filtered to obtain the catalyst cake, which is further oven dried in a hot air oven at 100 C for 12 hours and then calcined in a muffle furnace at a temperature of 400° C. for 4 hours in order to obtain 3 wt% Ce-Zr doped Cobalt-Manganese oxide with formula of $(Mn_xO_y)$ $(Co)^{n+}/Ce_{1.5}Zr_{1.5}O_2$, where x=3 to 5, y=4 to 8, n=2 to 3. The resulted catalyst has mixed phase composition of Manganese oxides in the form of Mn3O4 and Mn5O8, whereas Cobalt is in strong co-ordination with Manganese oxide with oxidation state of 2 to 3. The catalyst is denoted as CM-CZ-3.

Example 5: Electrochemical studies for oxygen reduction reaction on prepared catalysts In the separate experiments, the mixture of 3 mg of catalyst powder and 6.5 mg of Vulcan carbon is finely ball-milled to get catalyst-carbon composite, which is called as conductive catalyst. The obtained conductive catalyst was then made into slurry using isoproponol-water (30:70 vol/vol) mixture by sonication. The obtained slurry coated on a pre-cleaned glassy carbon electrode of diameter 0.3 cm. The electrodes are then dried at room temperature. The electrode coated with catalyst act as working electrode. A platinum coil with copper contact act as the counter electrode and Hg/HgO in contact with 0.5 M KOH is used as the reference electrode. The potential calibration of the reference electrode was performed in a high-purity hydrogen-saturated 0.5 M KOH solution. In RDE experiments, the rotating shaft is connected to the as working electrode. Using the rotating shaft, the angular velocity of the electrode can be precisely controlled. Linear sweep voltammetry was conducted at different rotating speeds from 200 to 2600 rpm. All experiments were conducted in a blanket of oxygen. During the experiments, it is observed that the current increases with increase in rotation speed of the electrode. For comparison, similar experiments were conducted with standard 40 wt% Pt/C catalyst. A comparison plot of all the results obtained from different catalysts is shown in FIG. 1.

Kinetic parameters such as the number of electrons involved in the reduction reaction and kinetic current from K-L plot is deduced for all the catalysts and reference Pt/C catalyst is summarized in table 1. The measured electron transfer number is in the range of 3.2 to 3.9. Notably, electron transfer number for redox buffer CM-CZ-2 catalyst recorded as high as 3.9 when compared to control catalyst, CM which recorded the lowest electron transfer number of 3.2. Furthermore, CM-CZ-2 catalyst shows higher activity as compared to standard 40 wt% Pt/C and undoped CM catalyst in terms of high kinetic current and rate constant.

TABLE 1

Comparison of kinetic parameters of CM-CNT, CM-CZ-1-CNT, CM-CZ-2-CNT, CM-CZ-3-CNT, and Pt/C

| Catalyst | Onset potential/ V vs. RHE | Half wave potential/ V vs. RHE | No. of electrons involved for ORR | Kinetic current (mA/cm2) | Kinetic rate constant (k) (cm$^2$/sec) | % $H_2O_2$ produced |
|---|---|---|---|---|---|---|
| CM-VC | 0.86 | 0.71 | 3.3 | 3.03 | $0.9 \times 10^{-2}$ | 17.5 |
| CM-CZ-1-VC | 0.89 | 0.74 | 3.6 | 3.33 | $0.92 \times 10^{-2}$ | 7.5 |
| CM-CZ-2-VC | 0.93 | 0.78 | 3.9 | 19.41 | $5.15 \times 10^{-2}$ | 2.5 |
| CM-CZ-3-VC | 0.87 | 0.73 | 3.6 | 4.47 | $1.3 \times 10^{-2}$ | 7.5 |
| Pt/C | 0.94 | 0.82 | 3.9 | 6.67 | $2.7 \times 10^{-2}$ | 2.5 |

Example 6: ORR stability comparative study fog the optimized CM-CZ-2 catalyst and CM (Control) catalyst Electrode durability for ORR is done by chronoamperometry at constant potential of 0.75 V with respect to RHE, wherein current is being monitored for the reaction with time. In this experiment the electrode used was catalyst modified glassy carbon electrode of 0.3 cm diameter. The material retains more than 95% of its activity or current during 20 hours of operation (FIG. 2), which implies that catalyst is stable towards the ORR reaction. But in the case of control catalyst (CM), there is a steep fall in the current (50-60%) in just 2 hours of operation. Furthermore, the current density of control catalyst is also recorded much lower (−0.1 mA/cm$^2$) than CM-CZ-2 catalyst (−0.25 mA/cm$^2$).

Example 7: Electrochemical studies for oxygen evolution reaction on prepared catalysts In separate experiments, the oxygen evolution reaction activity is evaluated of the prepared catalysts using a rotating glassy carbon electrode modified with the catalyst. A linear sweep voltammetry was performed in 0.5 M KOH solution from 1.05 V to 1.95 V with respect to RUE. The obtained performance of each catalyst is as shown in FIG. 3. The redox buffer catalyst CM-CZ-2 shows onset oxidation potential at 1.48 V with respect to RUE. The behavior trend of redox buffer catalysts shows as similar to ORR activity trend.

Example 8: Electrochemical impendence study for OER for the catalysts

Electrochemical impedance was recorded for all the catalysts in 0.5 M KOH by employing an AC voltage of frequency range from 100 kHz to 0.1 Hz. The amplitude of the AC voltage used is ±5 mV. All the spectra of all the catalysts recorded at a voltage of 1.6 V vs. RUE. The as obtained Nyquist plot for all the catalyst is given in FIG. (4). As shown in the figure the charge transfer resistance obtained for CM-CZ-2-VC (11 Ωcm$^2$) is much smaller as compared to all the catalyst and the trend observed in charge transfer resistance is in the same order observed in linear sweep voltammeter.

Example 9: OER stability comparative study for the optimized CM-CZ-2 catalyst and CM (Control) catalyst Electrode durability for oxygen evolution reaction is done by chronopotentiometry. The experiment is performed by holding the electrode at a current density of 10 mA/cm$^2$ and monitoring the potential with time. The maximum potential limit given is 1.95 V vs. RHE. In the case of CM-CZ-2 catalyst, it retains more than 95% of its activity or change in potential after 20 hours is within the limit of operation (FIG. 5), which implies that stability of the catalyst towards the reaction. But in the case of control catalyst (CM), it crosses the maximum potential limit after 5 hours of operation. This experiment manifests that redox buffer catalyst not only increases the activity but also stabilize the material from erosion during evolution reaction.

Example 10: Comparison of ORR/OER activity of CMCZ-2/Vulcan Carbon with other catalyst known in the art

| Catalyst | $E_{onset(ORR)}$/ V vs. RHE | $E_{1/2(ORR)}$/ V vs. RHE | $E_{onset(OER)}$/ V vs. RHE | $E_{10mA/cm^2(OER)}$/ V vs. RHE | $\Delta E^*$/ V vs. RHE |
|---|---|---|---|---|---|
| CMCZ-2/Vulcan Carbon | 0.93 | 0.85 | 1.48 | 1.61 (10 mA/cm2) | 0.76 |
| MnNiCoO$_4$/N-MWCNT | 0.95 | 0.88 | 1.58 | 1.64 (5 mA/cm$^2$) | 0.76 |

Prior art catalyst MnNiCoO$_4$/N-MWCNT comprising of oxides of Co, Mn, Ni deposited on Nitrogen doped multi walled carbon nanotubes (N-MWCNT) as per Yu et al (2015), was compared for the electrochemical properties with the catalyst CMCZ-2/Vulcan Carbon of example 5. It has been observed that OER activity of CMCZ-2/Vulcan Carbon of example 5 is superior to Yu's catalyst as indicated by OER onset potential. Furthermore, the CMCZ-2/Vulcan Carbon catalyst has current density of E10mA/cm$^2$ (OER)/V vs. RHE as compared to the current density of 5 mA/cm$^2$, in case of Yu's catalyst, which is 50% lower than that of the CMCZ-2/Vulcan Carbon catalyst described in the present application.

Example 11: Preparation of gas diffusion electrode:

An air electrode or gas diffusion electrode (GDE) is manufactured so as to obtain a porous, thin, and lightweight. The GDE serves as a barrier to separate the liquid electrolyte within an electrochemical system from the air surroundings. One side of GDE faces ambient air while the other side faces aqueous electrolyte (KOH). The electrolyte facing GDE is designed to be conductive surface with optimum wetting property, whereas air side facing GDE is designed to be porous water repelling hydrophobic surface, which is achieved by casting poly tetrafluoro ethylene (PTFE) film.

The expanded thin nickel mesh of definite pore size with opening of 0.3 mm, thickness 0.5 mm acts as a current collector, which is sandwiched between the conductive and hydrophobic layers to transport the electrons of the air electrode during the electrochemical reaction. The performance of GDE is strongly influenced by the nature of the bi-functional catalyst which is to be coated on the conductive surface of the GDE.

The porous conductive carbon layer constructed by forming the conductive carbon film which is obtained by mixing the porous carbon (70 wt%) with hydrophobic binder (30 wt%) namely PTFE powder, dispersed in organic solvent to form the conductive paste. Thus, obtained conductive paste is rolled into a sheet by stretching the carbon dough using roller press. The rolled sheet is casted on the one face of expanded nickel mesh and then hydraulically pressed at 100-ton pressure to firmly attach to the sheet. The resulted conductive sheet is oven dried at 80° C. for 12 hours and sintered at 250° C. for 2 hours.

The catalyst slurry prepared by homogeneously mixing the catalyst-carbon composite powder with 30 wt% polymer PTFE binder material, which is further dispersed in diethylene glycol monobutyl ether solvent and ultra-sonicated for 1 hr. The catalyst dispersed in the said solvent is spray coated uniformly on the gas diffusion conductive layer using a spray nozzle to achieve the catalyst loading of 30 mg/cm$^2$. The catalyst coated gas diffusion layer further cured to evaporate the solvent and sintered at 300° C. for 2 hrs.

Example 12: Construction of Metal-air cell:

The primary metal-air cell is constructed using polypropylene (PP) or acrylic plates, wherein Aluminium or Zinc metal plate metal plate is interposed between the two number of air electrodes. The air electrodes are placed on polypropylene (PP) or acrylic plates which serve as support plates for the air electrodes, wherein electrode having an active surface area of 50 cm$^2$. The gap of 1 cm is maintained from the central metal anode plate to air electrode to facilitate the electrolyte circulation. The slot is provided from the top portion to the middle PP plate to interpose the metal plate, thus enabling the metal plate easily swappable. The PP casing plates are screw tightened end to end to prevent the electrolyte leak. The middle PP casing plate equipped with two nozzles, one is at the bottom and another one is at the top of the cell for electrolyte circulation. The bottom nozzle used for electrolyte inlet and top nozzle used for electrolyte outlet, and two nozzles are fitted with alkaline resistive flexible tubing. The inlet tube is connected to a peristaltic pump for electrolyte circulation. The end support PP plate is perforated for air permeability to the air electrode. The current collectors of two air electrodes are joined by soldering, which is connected to positive terminal, while metal plate is connected to the negative terminal of the battery tester. The peristaltic pump circulates the electrolyte at an optimum speed of 1000-2000 ml/min to avoid the anode corrosion and heat dissipation.

Example 13: Performance evaluation of Air electrode in Aluminium-air battery,

Thus, constructed metal-air cell above is used for evaluation of air electrode in Al-air battery, wherein a thin Aluminium anode plate of 1.5 mm thickness with active surface area of 100 cm$^2$ is placed between the pair of air electrodes. Al anode is connected to the negative terminal of the battery tester, while pair of air electrodes are connected to positive terminal of the battery tester. The initial weight of Al anode plate is measured as 30 gm. On the other hand, air electrode contains a carbon-catalyst-binder mix loaded with 100 mg/cm$^2$, wherein active catalyst loading is 30 mg/cm$^2$.

6 M KOH is used as the electrolyte in the current experiment and stored in the electrolyte tank. The peristaltic pump was used to circulate the electrolyte to and from the cell at a constant flow rate of 1000 ml/minute. The electrolyte circulation in the cell enables to flush out precipitated aluminium hydroxide, minimize anode corrosion and heat dissipation during the cell discharge. Thus, assembled cell shows an open circuit potential (OCV) in the range 1.4 V to 1.7 V under no electrical load condition.

Figure 7:
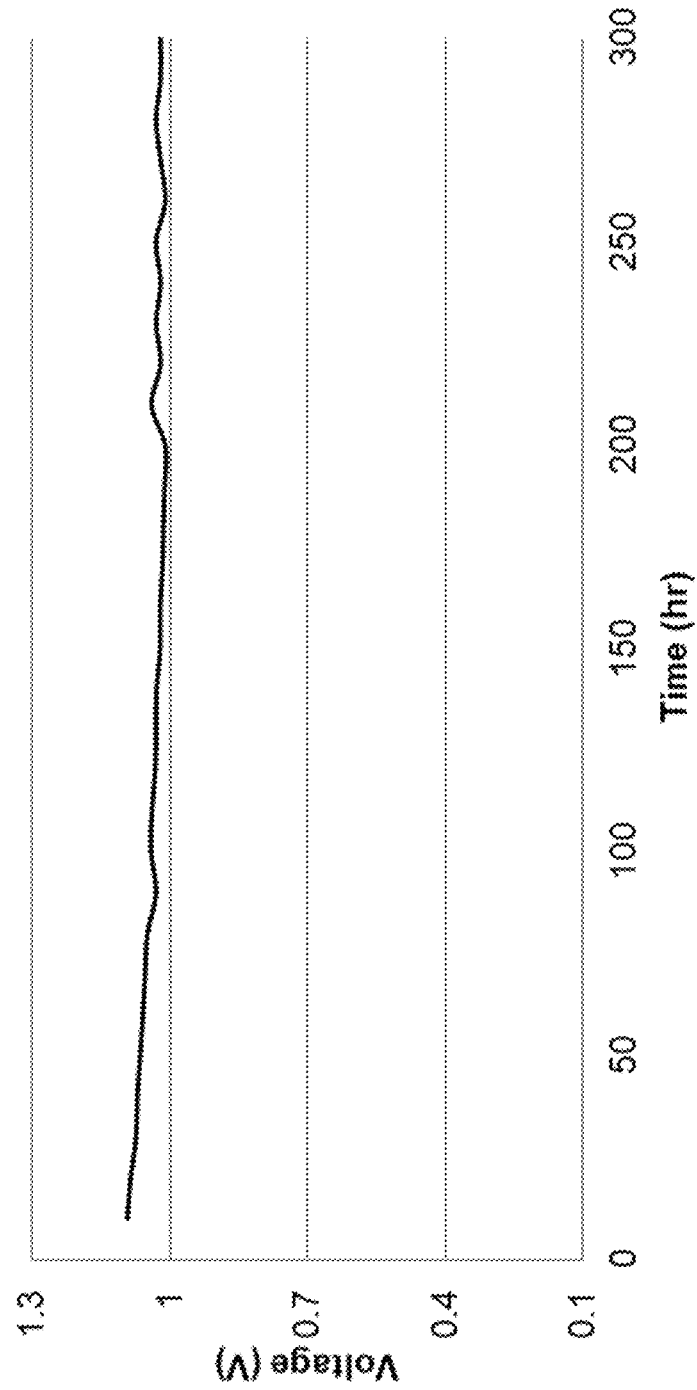
FIG. 7: depicts endurance study of Air electrode of CM-CZ-2 catalyst in Al-air cell.

The discharge performance of Al-air cell evaluated for the optimized CM-CZ-2 catalyst. The specific capacity is recorded as 2.7 to 2.9 Ah/gm of Al at high current density, whereas corresponding energy density of 2.8 kWh/kg of Al is recorded FIG. (6). Durability test for the air electrode of CM-CZ-2 catalyst has been carried out by changing of the Al anode plate after Al plate depleted by 80%. The test is being conducted for 300 hrs of the test. The cumulative energy density of the cell or the entire time period is calculated as 2.5 kWh/kg of Al (FIG. 7).

Air electrode of CM-CZ-2 catalyst and control CM catalyst fabricated as per procedure mentioned in example 10. The pair of air electrodes obtained from CM-CZ-2 & CM catalysts have been evaluated in Al-Air cell. The data of Al-air cell performance for two air electrode shown in Table 3, where voltage, specific capacity and energy density of Al-air cell is reported at different discharge current densities varying from 75 to 150 mA/cm$^2$. It is noted that, as the discharge current density increases, voltage of the cell is reduced marginally in case of optimized CM-CZ-2 based Air electrode, while compare with control CM catalyst based Air electrode, which could be due to faster ORR kinetic current of CM-CZ-2 catalyst (Data shown in Table 1). The specific capacity of Al is increased due to effective utilization of anode at higher current density, thus resulting in higher energy density per weight of Aluminum.

TABLE 3

Comparison of performance for Al-air battery for CM catalyst (Control) and CM-CZ-2 catalyst

| Catalyst | 75 mA/cm² | | | 100 mA/cm² | | | 150 mA/cm² | | |
|---|---|---|---|---|---|---|---|---|---|
| | Average Working Voltage/ V | Specific capacity/ (Ah/g of Al) | Energy density/ (kWh/kg of Al) | Average Working Voltage/ V | Specific capacity/ (Ah/g of Al) | Energy density/ (kWh/kg of Al) | Average Working Voltage/ V | Specific capacity/ (Ah/g of Al) | Energy density/ (kWh/kg of Al) |
| CM-VC | 1.05 | 1.75 | 1.84 | 0.95 | 1.9 | 1.85 | 0.8 | 2.2 | 1.76 |
| CM-CZ-2-VC | 1.17 | 1.9 | 2.2 | 1.1 | 2.3 | 2.5 | 1.0 | 2.5 | 2.5 |

Example 14: Construction of Zn-air cell and air electrode evaluation

Figure 8:
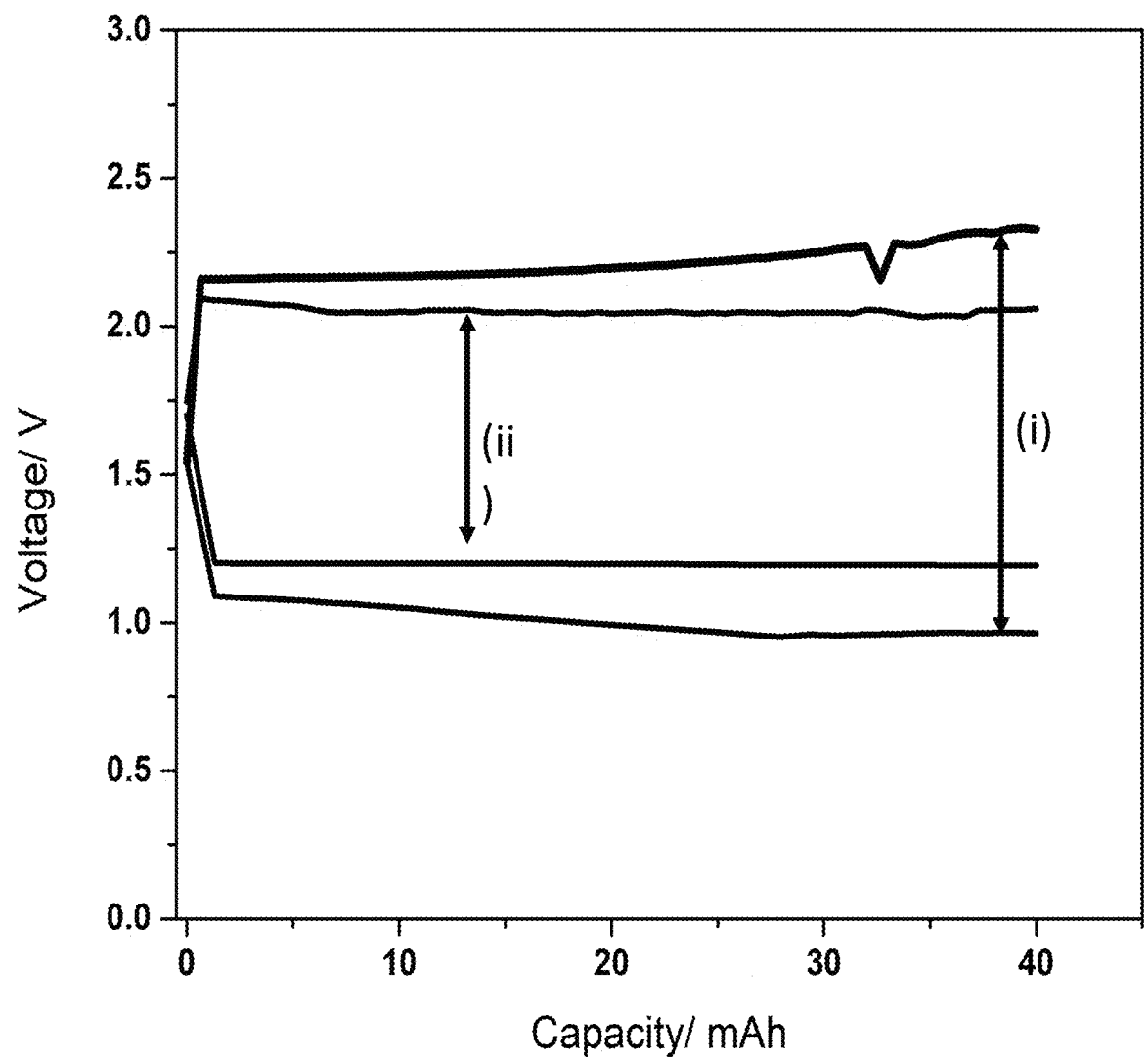
FIG. 8: depicts charge/discharge profile of Zn-air cell for CM and CM-CZ-2 catalysts.

The basic construction of Zn-air cell is followed as same in example 11 however, electrolyte in the cell is in stationary phase. Further, conductive substrate is being used for zinc deposition, wherein substrate plate can be nickel metal plate of 1 mm thickness. Zinc precursor solution prepared by dissolving 0.5 M zinc oxide in 9 M KOH solution, which is filled in the metal-air cell. The two air electrodes are connected to positive terminal and nickel substrate pate for zinc deposition is connected to negative terminal of the battery tester. The active surface area of nickel substrate plate is 100 cm² and current density for both charge and discharge is applied at 40 and 80 mA/cm² respectively. In the separate experiment, air electrode of control catalyst and optimized redox buffer catalyst namely CM-CZ-2 is tested for comparison of zinc-air battery performance. Thus, assembled Zn-air cell shows OCV in the range 1.54 V to 1.7 V under no load condition. Initially, charging step is performed for zinc deposition on nickel substrate at a current density of 40 mA/cm² where the cell potential rises slowly from 1.5 V to 2.3 V, and then cell is subjected to discharge at current density of 80 mA/cm², where cell potential decreased to 1.1 V, and it is maintained the steady state. The plot representing charge/discharge potential of control catalyst (CM) and redox buffer CM-CZ-2 catalysts versus cell capacity is shown in FIG. 8.

Figure 9:
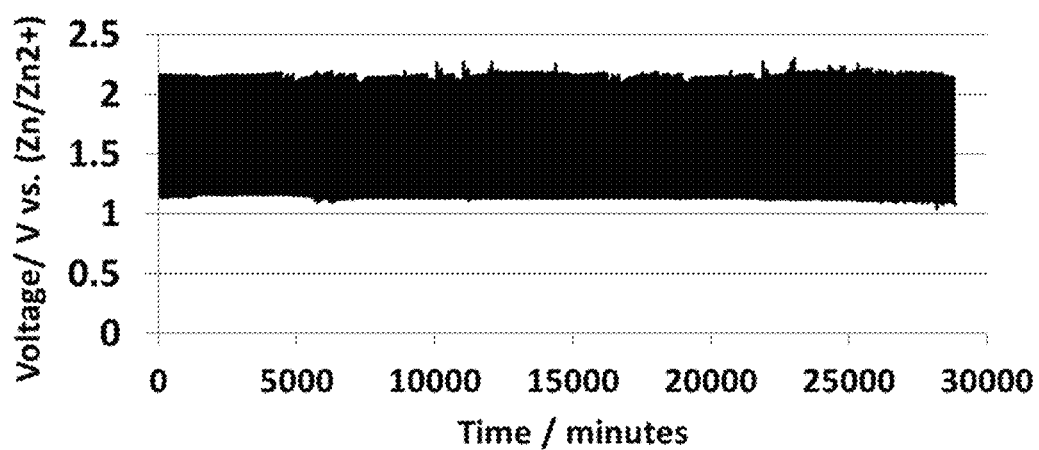
FIG. 9: depicts Zn-air cell cycle life study at 25 mA/cm$^2$ (Total number of cycles: 325): Each Cycle duration is 1 hour 45 minutes.
Figure 10:
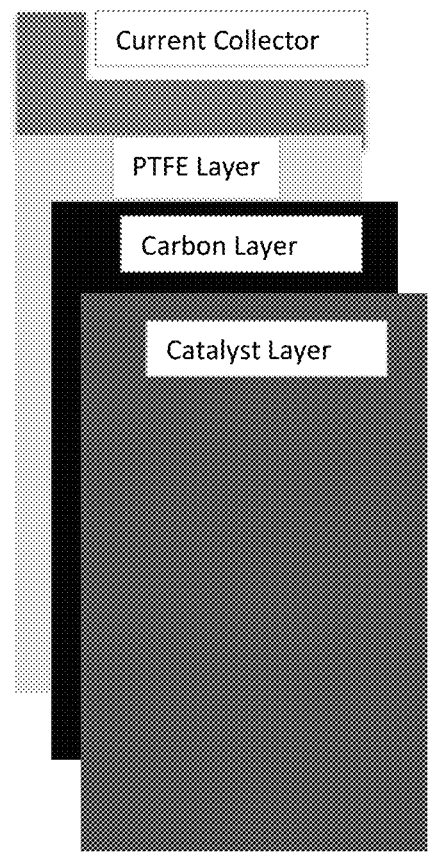
FIG. 10: illustrates air electrode construction.

The Zn-air cell life cycle study was conducted using CM-CZ-2 catalyst-based air electrode under charge-discharge protocol at current density of 25 mA/cm². Each cycle duration is 1 hr 45 min. The plot for cycle life study of Zn-air cell is shown in FIG. 9, where total of 325 charge-discharge cycles are recorded.

Advantages of the invention:
ORR activity of the catalyst is comparable performance to standard Pt/C catalyst
Redox buffer Catalyst is bi-functionally active, moreover OER activity is very significant when compared with reference catalyst without redox buffer
Redox activity towards oxygen activation at the electrode-electrolyte interface improved

We claim:

1. An electrocatalyst composition comprising redox buffer metals represented by formula (1) $(Mn_xO_y)(Co)^{n+}/Ce_iZr_jO_2$, wherein x=1 to 5, y=2 to 8, n=2 to 3, i=0.01 to 0.75 and j=0.1 to 0.95, and wherein cerium-zirconium is in a range of 0.1 to 5 wt%, and a weight ratio of cerium to zirconium is in a range of 0 to 1.

2. The electrocatalyst composition as claimed in claim 1, wherein manganese is in a range of 0.1 to 99 wt%, and cobalt is in a range of 0.1 to 30 wt%.

3. An electrode comprising the electrocatalyst as claimed in claim 1.

4. An electro-chemical cell comprising the electrode as claimed in claim 3.

5. The electro-chemical cell as claimed in claim 4, wherein the electrochemical cell is a fuel cell, a battery, a redox flow battery, or a metal/air rechargeable cell.

6. The electrocatalyst composition as claimed in claim 1, wherein said composition can be prepared by any of the techniques selected from the group consisting of wet-impregnation, sequential precipitation, co-precipitation, deposition-precipitation, and solvothermal synthesis.

7. A method for preparing electrocatalyst composition comprising redox buffer metals, said method comprising steps of:
(i) preparing cobalt-manganese hydroxides solution comprising steps of:
   a) preparing separate solutions of cobalt and manganese precursors in deionized water,
   b) mixing the precursor solutions of cobalt and manganese, and
   c) adding alkaline base solution selected from the group consisting of an aqueous solution of NaOH, $Na_2CO_3$, $NaHCO_3$, $NH_4OH$, and a combination thereof to the mixed precursor solution of cobalt and manganese obtained in step b), at a pH of 7 to 11 and obtaining precipitated cobalt-manganese hydroxides;
(ii) preparing a redox buffer metal precursor solution comprising steps of:
   a) preparing separate solutions of cerium and Zirconyl precursors in deionized water, and
   b) optionally mixing the cerium precursor solution and zirconyl precursor solution to obtain a composite solution;
(iii) mixing of precipitated solution of cobalt-manganese hydroxides with redox buffer metal precursor solutions, the mixing comprising steps of:
   a) mixing the precipitated solution of cobalt-manganese hydroxides obtained in step (i) c) with cerium precursor solution and zirconyl precursor solution obtained in step (ii) a) or a composite solution obtained in step (ii) b),
   b) stirring the resultant suspension for 12 hours,
   c) vacuum filtering the suspension obtained in step (iii) b) to obtain the catalyst slurry, d) repeatedly washing the catalyst precipitates obtained in step (iii) c) with deionized water, followed drying the obtained catalyst cake in oven at 50 to 100° C., and e) calcining the catalyst cake at 400-600° C. to obtain electro-catalyst composition with redox buffer metals of formula (1) $(Mn_xO_y)(Co)^{n+}/Ce_iZr_jO_2$, wherein x=1 to 5, y=2 to 8, n=2 to 3, i=0.01 to 0.75 and j=0.1 to 0.95.

8. The method as claimed in claim 7, wherein the cobalt precursor is selected from the group consisting of cobalt nitrate, cobalt chloride, cobalt acetate, cobalt sulfate, and cobalt nitrate hexahydrate.

9. The method as claimed in claim 7, wherein the manganese precursor is selected from the group consisting of manganese nitrate tetrahydrate, manganese acetate tetrahydrate, manganese sulfate, and manganese chloride.

10. The method as claimed in claim 7, wherein the cerium precursor is selected from the group consisting of cerium nitrate, cerium chloride hepta hydrate, ammonium ceric nitrate hydrate, and ammonium ceric sulphate hydrate.

11. The method as claimed in claim 7, wherein the zirconium precursor is selected from the group consisting of zirconyl chloride octahydrate, and zirconyl nitrate hydrate.

\* \* \* \* \*